United States Patent

[11] 3,550,583

[72] Inventors Takewo Chiku
 Toyota-shi;
 Isemi Igarashi, Nagoya-shi, Japan
[21] Appl. No. 725,314
[22] Filed Apr. 30, 1968
[45] Patented Dec. 29, 1970
[73] Assignee Kabushiki Kaisha Toyota Chuo Kenkyusho
 Aichi-Ken, Japan
[32] Priority May 13, 1967
[33] Japan
[31] No. 42/30476

[54] NEEDLE-SHAPED PRESSURE TRANSDUCER
 5 Claims, 3 Drawing Figs.
[52] U.S. Cl. .................................................... 128/2.05,
 73/398
[51] Int. Cl. ..................................................... A61b 5/02
[50] Field of Search ........................................ 128/2.05DM,
 2; 73/398, 398R

[56] References Cited
 UNITED STATES PATENTS
2,648,328 8/1953 Hathaway et al. ............ 128/2.05

| | | | |
|---|---|---|---|
| 2,799,788 | 7/1957 | Fitzgerald et al. ............ | 73/398X |
| 2,959,056 | 11/1960 | Traite et al. ................... | 128/2.05X |
| 3,038,465 | 6/1962 | Allard et al. ................... | 128/2.05 |
| 3,240,065 | 3/1966 | Taber ............................. | 73/398X |
| 3,337,844 | 8/1967 | Baltakis ......................... | 73/398X |

OTHER REFERENCES
 Angelakos, "American Journal of Medical Electronics," Oct.-Dec., 1964, pp. 266—270 (128—2.05D)

*Primary Examiner*—William E. Kamm
*Attorney*—Berman, Davidson and Berman

ABSTRACT: A transducer comprising a slender outer tube and a sensing mechanism therein, said tube being closed on its one end by a diaphragm and a plug of nonconstrictive material to sense a pressure, or other force, from the outside of the transducer pressure to said sensing mechanism, said sensing mechanism being disposed parallel to the axis of said tube and including at least one sensing element of semiconductive material to convert said pressure when applied into a change in internal resistance by the piezoresistance effect. The transducer may be of microminiature size and shaped as an injection neddle suitable for insertion into a body vessel to convert and measure blood pressure, for example.

PATENTED DEC 29 1970

3,550,583

INVENTORS.
TAKEWO CHIKU,
ISEMI IGARASHI.

By Berman, Davidson & Berman
ATTORNEYS.

NEEDLE-SHAPED PRESSURE TRANSDUCER

The present invention relates to a transducer device and more particularly to such a device utilizing a sensing element made from an electrical semiconductive material.

For measuring blood pressure of a living body, it has been usual to employ a method of selecting parts adjacent the surface of a living body, such as blood vessels of veins or arteries, pressing said blood vessels to temporarily stop the circulation of blood and thereby detecting the blood pressure by the pressing force (hereinafter called the Indirect Method). In such Indirect Method, the measured pressure frequently does not fully conform to the pressure in the blood vessels due to resilient character of the living body thus pressed. Methods have been required, therefore, for directly measuring the blood pressure by a pressure meter in contact with the blood itself and such methods are referred to as the Direct Methods hereinafter.

Two Direct Methods have been known in one of which the skin of a living body is cut open and blood vessels are exposed, said blood vessels being connected to pipes leading to a measuring chamber, and the blood is introduced to said chamber outside the living body whereby the pressure in said chamber is measured. In the second Direct Method, a container-type pressure transducer having two diaphragms is inserted in the blood vessels of a living body. Such container-type pressure transducer was invented by the present applicants and disclosed in the Japanese Patents Nos. 502,405 and 502,410. However, this method requires cutting and opening of a living body; thus it is not suitable for ordinary pressure measurements except for pathological research, other special work, or animal experiments.

The first Direct Method could not avoid the effect of resiliency of the pipe connected to the outside of a living body, and the effect of friction or pressure propagation of the pipe body to the interior of the measuring chamber. The second Direct Method encounters difficulty in the manufacture of a pipe having an outer diameter less than 3mm and, therefore, it is difficult to obtain measurements of pressure in ordinary living bodies.

It is a primary object of the present invention to overcome the defects and disadvantages of conventional transducers as briefly outlined above and to provide much simpler means for measuring blood pressure, which does not require the cutting or opening of the skin of a body, and which employs a piercing or injection type needle as used in ordinary diagnostic procedure.

A general object of the invention is to provide a new transducer having a slender outer tube with a sharpened rigid open end portion to which the pressure to be measured is applied, and a slender cylindrical sensing mechanism including at least one sensing element of semiconductive material therein to sense a pressure or other force to be measured to axial direction of said sensing mechanism and convert the same into an electrical signal.

Another object of the invention is to provide a transducer, having the above described characteristics, in which the sensing mechanism has a tube which forms an outer cylindrical wall, at least one sensing element, disposed parallel to the axial direction of said tube and a strain sensing filler completely occupying the interior of said tube.

A further object of this invention is to provide a transducer, having the above-described characteristics, said outer tube being closed at the forward end by a filler, said sensing mechanism disposed in coaxial relation to said outer tube, and secured to said filler by its one end.

A further object of this invention is to provide a pressure transducer, having the above-described characteristics, in which a sharpened edge is provided at one end of said outer tube so as to form an injection needle and said sensing mechanism is provided in the interior space of said injection needle.

The novel features that are considered characteristic of the invention are set forth with particularity in the appended claims. The invention, itself, however, both as to its organization and its method of operation, together with additional objects and advantages thereof, will best be understood from the following description of specific embodiments when read in connection with the accompanying drawings, wherein like reference characters indicate like parts throughout the several FIGS. and in which:

Figure 1:
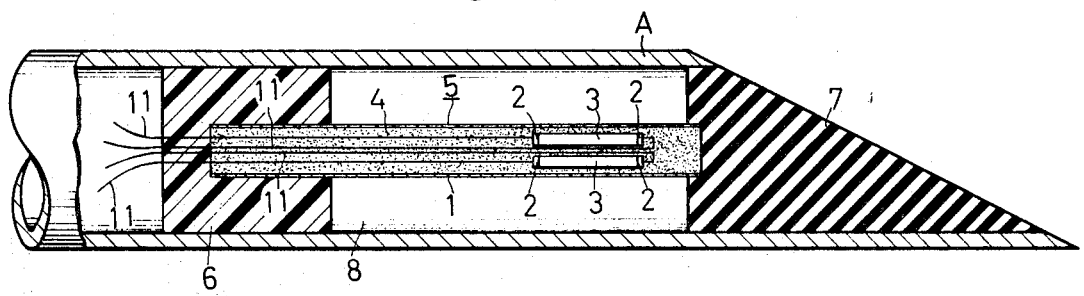
FIG. 1 is a cross-sectional view of an embodiment.
Figure 2:
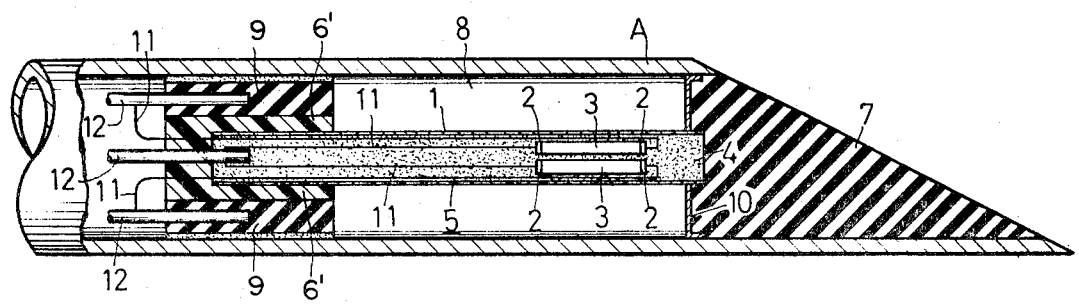
FIG. 2 is a cross-sectional view of the FIG. 1 embodiment slightly modified.

Now referring to the drawings, and more particularly to FIGS. 1 and 2, wherein is shown a sensing mechanism designated as a whole by 5, and which includes a slender tube 1, a pair of strain sensing elements 3, 3 formed as strips or bars of a semiconductive material, which are disposed parallel to the axis of tube 1 and each having a terminal or electrode 2 at each end, and filling material 4 surrounding the strain sensing elements 3 and filling the interior space of slender housing tube 1.

It is to be understood that when a force, or a pressure in a pressurized medium, is applied to one end of tube 1, the pressure or force is transmitted in the direction parallel to the axis of said slender tube 1 through said filler 4, and is converted to an electric signal as by resistance variation due to the piezoresistive effect on the semiconductive strain sensing elements 3.

In both FIGS. 1 and 2, a sensing mechanism 5, as above-described is installed within rigid outer tube A which is provided with a sharpened edge or a sharpened end portion on its forward end so as to form a hypodermic injection needle. The sensing mechanism 5 is installed in or near the sharpened open end portion of the outer tube A.

The rear portion (left in FIG. 1) of the sensing mechanism 5 is secured to the inner face of tube A by a spacer 6 which is a plug composed of a rigid resin. The front portion (right in FIG. 1) of the sensing mechanism 5 is secured to a filler 7 closing the front open end of tube A and which is composed of a nonconstrictive resin. A space 8 is left between parts 6 and 7 across which extends the sensing mechanism 5 spaced from the inner peripheral wall of tube A.

In the embodiment shown in FIG. 2, there is provided at the rear end of the sensing mechanism 5, a tube 9 of electrically insulating material cemented to the inner wall of the injection needle A. A ring of rigid resin 6' plugs the tube 9 and together they form a spacer for the inner end of sensing mechanism 5. The rear end of ring 6' is closed leaving a central forward bore seating the rear of sensing mechanism 5. The front open end of tube A is closed by a diaphragm 10 of thin metal plate, the outer diameter of which equals the inner diameter of the outer tube A and by the filler 7 disposed over the front surface of the diaphragm 10 and extending to the sharpened end of the outer tube A.

In FIGS. 1 and 2, the electrodes 2 of the strain sensing elements 3 are each connected to lead wires 11, 11 which in turn pass entirely through tube 1 and filler 4 and run to the rear end of the outer tube A through the spacer 6, 6'. These lead wires 11, 11 are led to the outside of the outer tube A to form a bridge circuit (not shown) including the strain sensing elements 3, 3 which provide an electric output proportional to the pressure exerted against the filler 4 in tube 1. In FIG. 2, numeral 12 designates relatively heavy rigid wires, one end of each of which is embedded in the tube 9. These wires are connected to the lead wires 11, 11 and serve as lead-outs for connection of the strain sensing elements 3, 3 in said external bridge circuit as well as supports for enabling the insertion of the tube 9 into tube A during assembly.

In use of the transducers of FIGS. 1 and 2, the sharpened open end of the outer tube A is inserted through the skin of a person, or body, to pierce a blood vessel as in an ordinary injection, the pressure of the blood in the vessel then being transmitted to the sensing mechanism 5 through the filter 7 of the nonconstrictive resin. A force proportional to the sectional area of tube 1 in relation to that of tube A in the plane perpendicular to the axis of the outer tube acts on the sensing mechanism 5 as a uniaxial compression force. Such uniaxial compression force is then transmitted to the strain sensing elements 3 through the filling material 4, imparting compression to them in their longitudinal direction. As a result, the strain sensing elements 3, 3 incur a resistance variation due to piezoresistive effect proportioned to the force imparted by the strain thus produced and when the strain sensing elements are powered by an electric voltage in the aforementioned bridge, such resistance variation is converted to changes in current, or electric signals for detection of pressure in the blood vessel.

In FIGS. 1 and 2, the sensing mechanism 5 is subjected to an axial force proportioned to the inside sectional area of the outer tube A in a plane perpendicular to the axial direction of the outer tube as previously described but in FIG. 2 the output of the sensing mechanism is increased to correspond to the inner diameter of the outer tube A because of the diaphragm 10 connected to both tube A and tube 1. Said output is larger in the transducer of the embodiment of FIG. 2 than in that of FIG. 1 although the damage incurred on a body blood vessel may also be larger, particularly for the dimensions given in the example below.

The following are the examples of construction of the embodiments in FIGS. 1 and 2:

EXAMPLE 1 (Fig. 1)

Strain sensing element 3:
    n-Type and p-type germanium element (one each).
    Dimensions: Length 3 mm. x Width 0.06 mm. x Thickness 0.008 mm.
Filling material 4: AV-8 Araldite (Trademark).
Slender Tube 1: Glass tube.
    Dimensions:
        Outer diameter 0.2 mm.
        Inner diameter 0.14 mm.
Injection Needle or Outer Tube a:
    Dimensions:
        Outer diameter 0.5–0.6 mm.
        Inner diameter 0.28–0.33 mm.
Rigid Resin 6: AV-8 Araldite (Trademark).
Nonconstrictive Resin 7: RTV silicone rubber KE 42.

EXAMPLE 2 (Fig. 2)

Strain sensing elements, filling material and slender tube are the same in characteristics as shown in Example 1.
Injection Needle or Outer Tube a:
    Outer diameter 1–1.25 mm.
    Inner diameter 0.65–0.9 mm.
Slender Tube 1:
    Outer diameter 0.5–0.6 mm.
    Inner diameter 0.3 mm.
Diaphragm 10: 0.03 mm. copper plate.
Rigid resin and nonconstrictive resin are the same as shown in Example 1.

Upon inserting the transducer into a body, a large resistance is exerted on the pressure transducer since the tip end of the outer tube penetrates through the outer skin of the body. Said insertion resistance is applied as a uniaxial compression force of the sensing mechanism 5 through the filler 7 which is composed of nonconstrictive resin.

Generally, the mechanical strength of the strain sensing element consisting of a single crystal of semiconductor is greater against a compression force than against a tension force and weakest to a transverse force so much as to be easily broken. Since the sensing mechanism 5 of FIGS. 1 and 2 is provided with a surrounding slender tube 1 of resilient material, it can bear considerable insertion resistance because said slender tube 1 bears such insertion resistance and prevents the strain sensing elements from being subjected to buckling and the insertion resistance may act as a uniaxial compression force for the strain sensing elements. For example, in case the allowable range of strain in the longitudinal direction of the strain sensing element 3 in the above examples 1 and 2 is less than $3,000 \times 10^{-6}$ (cm/cm), the maximum pressure of insertion resistance produced from the strain as converted for calculation is, for an outer tube of 0.8mm inner diameter, about 100 kg/cm$^2$ and, for an outer tube of 0.3mm inner diameter about 700 kg/cm$^2$ to be applied on the tip end of the transducer. Accordingly, if the pressure exerted on the nonconstrictive resin upon insertion of an transducer is less than that of said pressures, the detection part of the pressure transducer will not be destroyed.

Further, when a larger insertion resistance is applied on the sensing mechanism 5, an extreme constriction of the filling material may be avoided by adhesion of the filling material to the slender inner tube 1 which is an advantage of the strain sensing element being prevented from deformation and capable of resisting the insertion resistance.

Figure 3:
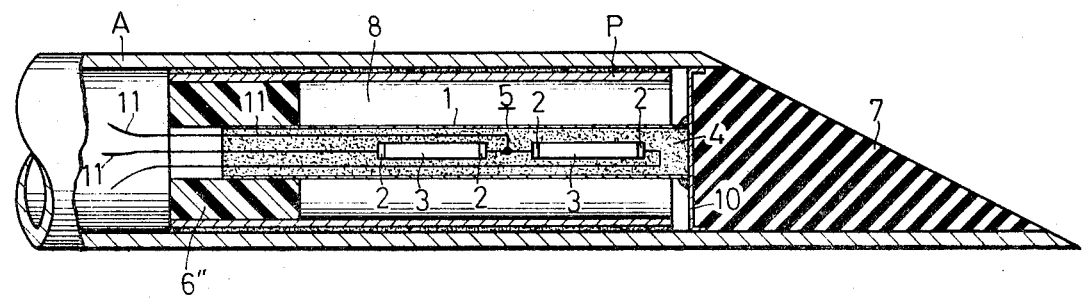
FIG. 3 is a cross-sectional view of another modified embodiment, the original of which is shown in FIG. 1.

In FIG. 3 is shown another modified embodiment, an inner tube P being adhesively secured to the inner peripheral wall face of the outer tube A to withstand higher insertion resistance. One end of the sensing mechanism 5 is adhered to the rear surface of the diaphragm 10 and the other end of the strain transducer 5 is secured to the inner wall face of the inner tube P by a spacer 6" composed of a rigid resin.

In the embodiment of FIG. 2, the filler 7 is composed of a nonconstrictive resin and occupies all the open space at the front of the needle covering the front surface of the diaphragm 10 to the sharpened end of the outer tube A coaxially. The spacer 6' is provided with several rigid wires 12 to aid in assembling the sensing mechanism 5 in the outer tube.

Although the description hereinbefore made on the present invention particularly referred to the manner of detection of pressure in the living body of man and animals, the injection is not limited in use for the measurement of pressure in such living bodies, but also it is adapted widely for the detection of pressure in, or outside any pressure medium in static condition as well as in dynamic variation.

Furthermore, the strain sensing elements of the sensing mechanism of this invention can use only one element for detecting pressure instead of two elements as illustrated. Thus, it is possible to effect a temperature compensation by assembling two or four strain sensing elements of equivalent in temperature dependent conversion characteristics in a half bridge, or full bridge circuit, any change in temperature in the pressure medium does not affect the output from this device. As shown in the embodiments described, a p-type and an n-type element used as a pair will serve to convert the pressure to an electric signal in the most sensitive way.

Although certain specific embodiments of the invention have been show and described, it is obvious that many modification thereof are possible. The invention, therefore, is not to be restricted except insofar as is necessitated by the prior art and by the spirit of the appended claims.

We claim:

1. A transducer comprising a rigid outer tube sharpened to a point at one open end to which the pressure to be measured is applied, a cylindrical sensing mechanism disposed within said outer tube and including at least one strain sensing element of semiconductive material thereon, a resilient filling material closing said pointed open end of said outer tube and securing one end of said sensing mechanism, and a spacer securing the other end of said sensing mechanism, and a spacer securing the other end of said sensing mechanism to said outer tube to form a space between the outer peripheral surface of said sensing mechanism and the inner peripheral surface of said outer tube and to dispose said sensing mechanism substantially parallel to the direction of said outer tube.

2. A transducer according to claim 1, wherein said sensing mechanism is provided with a housing tube which forms the cylindrical outer wall of said sensing mechanism, said strain sensing element being disposed parallel to the axial direction of said housing tube, and a filling material surrounds said strain sensing element completely occupying the interior space of said housing tube.

3. A transducer according to claim 2, wherein is further provided a diaphragm having its outer periphery secured to the inner peripheral surface of said outer tube, one end of said sensing mechanism being secured to said diaphragm and said filling material closing the pointed end of the outer tube and being disposed over the surface of said diaphragm and extending to the sharpened point of said outer tube.

4. A transducer according to claim 2 wherein said outer tube is an injection needle.

5. A transducer according to claim 2, wherein is further provided an inner tube having its outer peripheral surface secured to the inner peripheral surface of said outer tube, and the said other end of said sensing mechanism being secured to the inner peripheral surface of said inner tube by said spacer.

UNITED STATES PATENT OFFICE
CERTIFICATE OF CORRECTION

Patent No. 3,550,583      Dated December 29, 1970

Inventor(s) Takewo Chiku et al.

It is certified that error appears in the above-identified patent and that said Letters Patent are hereby corrected as shown below:

Column 4, lines 66 and 67, cancel "and a spacer securing other end of said sensing mechanism".

Signed and sealed this 4th day of May 1971.

(SEAL)
Attest:

EDWARD M. FLETCHER, JR.       WILLIAM E. SCHUYLER,
Attesting Officer      Commissioner of Pate